United States Patent
Schein et al.

(10) Patent No.: US 11,221,225 B2
(45) Date of Patent: Jan. 11, 2022

(54) ROUTING WITH U-TURN INHIBITION

(71) Applicant: Ford Global Technologies, LLC, Dearborn, MI (US)

(72) Inventors: Victoria Leigh Schein, Dearborn, MI (US); Jonathan Thomas Mullen, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 10 days.

(21) Appl. No.: 16/069,956

(22) PCT Filed: Jan. 14, 2016

(86) PCT No.: PCT/US2016/013465
§ 371 (c)(1),
(2) Date: Jul. 13, 2018

(87) PCT Pub. No.: WO2017/123234
PCT Pub. Date: Jul. 20, 2017

(65) Prior Publication Data
US 2021/0041255 A1    Feb. 11, 2021

(51) Int. Cl.
*G01C 21/34*    (2006.01)
(52) U.S. Cl.
CPC ..... *G01C 21/3461* (2013.01); *G01C 21/3484* (2013.01)

(58) Field of Classification Search
CPC ................................................ G01C 21/3461
See application file for complete search history.

(56) References Cited

U.S. PATENT DOCUMENTS

| | | | |
|---|---|---|---|
| 8,694,246 B2 * | 4/2014 | Yamakawa | G01C 21/36 701/428 |
| 8,831,874 B1 * | 9/2014 | Pettis | G01C 21/3461 701/410 |
| 9,086,297 B2 * | 7/2015 | Haleem | G01C 21/3697 |
| 10,175,057 B2 * | 1/2019 | Geelen | G01C 21/3626 |
| 10,807,595 B2 * | 10/2020 | Schein | G08G 1/096741 |
| 10,889,294 B2 * | 1/2021 | Schein | B60W 30/0953 |
| 2007/0138347 A1 * | 6/2007 | Ehlers | G08G 1/096844 246/1 R |

* cited by examiner

*Primary Examiner* — Michael A Berns
(74) *Attorney, Agent, or Firm* — Brandon Hicks; Eversheds Sutherland (US) LLP

(57) ABSTRACT

Methods, devices and apparatuses pertaining to routing with U-turn inhibition. A method may include receiving, by a computing device, geographic information of a destination and geographic information of a current location of a vehicle and evaluating feasibility of a U-turn along a path between the current location and the destination using the geographic information. The computing device may further calculate a U-turn cost parameter associated with the U-turn representative of the feasibility, and determine a feasible route between the current location and the destination based on the U-turn cost parameter using a routing algorithm.

16 Claims, 5 Drawing Sheets

ROUTING WITH U-TURN INHIBITION

TECHNICAL FIELD

The present disclosure generally relates to traffic safety and, more particularly, to methods and systems for routing with U-turn inhibition.

BACKGROUND

A vehicle may need to be maneuvered differently when a driver of the vehicle makes certain maneuvers such as a circular turning and stopping. Particularly, the vehicle may not be able to turn completely around in a given area when an object, such as a boat, another vehicle, a trailer or a towable object, is attached to or otherwise towed by the vehicle. In the case that a navigation system of the vehicle considers a missed turn, the navigation system may suggest a U-turn. However, the suggested U-turn might be infeasible for the vehicle or undesirable to the driver.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Implementations herein relate to routing with U-turn inhibition. A driving assistance system may determine feasibility of performing a U-turn based on vehicle parameters (e.g., vehicle dimensions and turning radius of the vehicle) and geographic information of a location where the U-turn is to be performed. For example, the driving assistance system may determine a driving path for the vehicle and determine the feasibility of the driving path at a given location. The driving assistance system may further incorporate a U-turn cost parameter into a path routing algorithm to determine a feasible route from the location to a destination. In some implementations, the driving assistance system may further adjust the U-turn cost parameter based on user information of an operator of the vehicle against performing U-turns. Moreover, the driving assistance system may further consider crowdsourced data related to previous attempts by the operator or other operator(s) in performing U-turns at the location.

Figure 1:
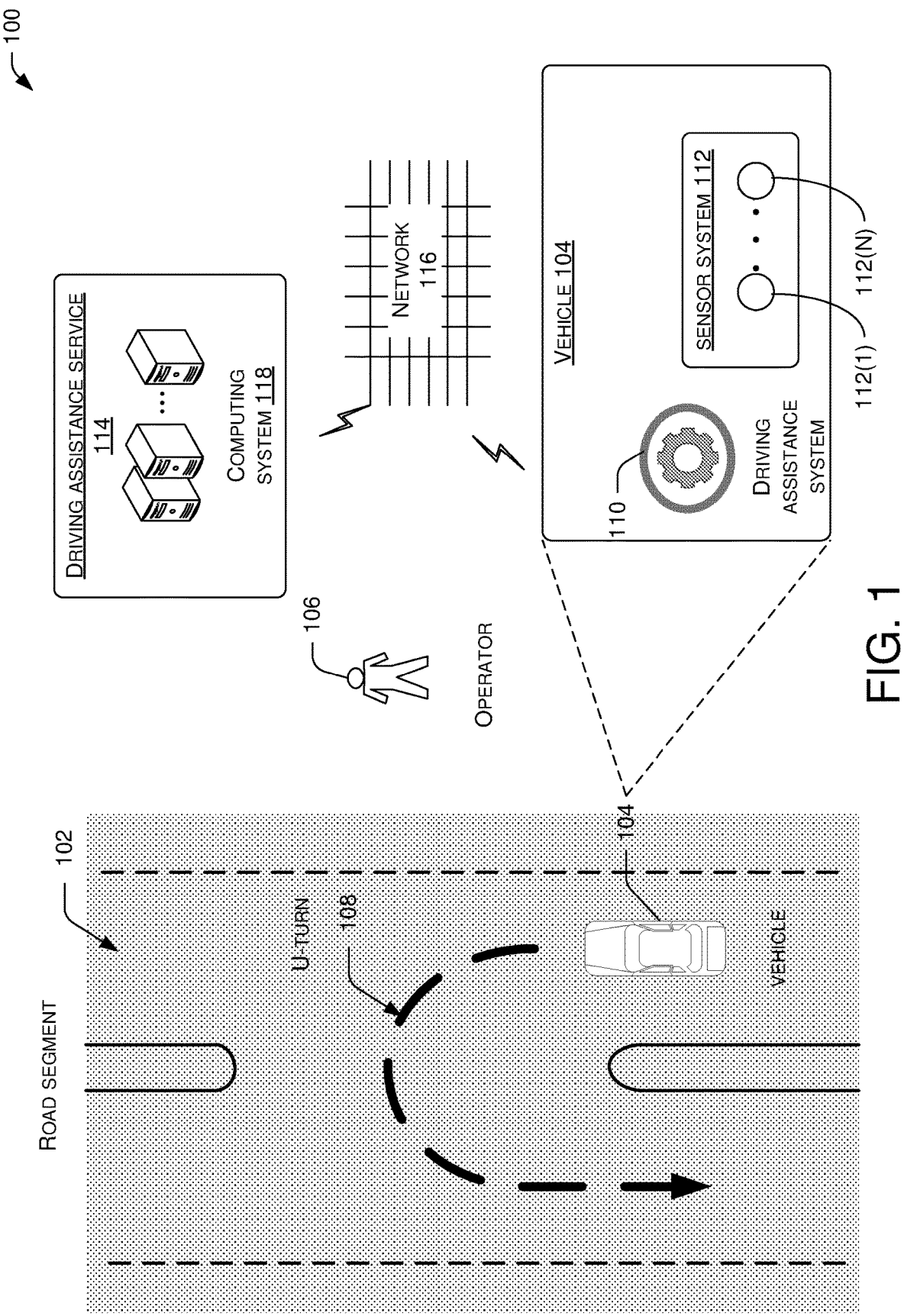
FIG. 1 is a diagram depicting an example environment in which example embodiments of the present disclosure may be implemented.

FIG. 1 illustrates an example environment 100 in which example embodiments of the present disclosure may be implemented. Environment 100 includes a road segment 102 and a vehicle 104 that is operated by an operator 106 on road segment 102 to perform a U-turn 108. Vehicle 104 may be equipped with a driving assistance system 110 that facilities driving assistance. In some implementations, driving assistance system 110 may enable communications between the operator 106 and other systems associated with vehicle 104 without interrupting the operation of vehicle 104 by operator 106. For example, driving assistance system 110 may include a vehicle accessory including a human interface device (e.g., a dashboard-mounted touch screen and/or one or more mechanical buttons) that is user-friendly and accessible to operator 106.

In some implementations, driving assistance system 110 may include an interface placed within reach of operator 106 such that operator 106 may easily access the interface to launch, trigger or otherwise initiate driving assistance (e.g., U-turn assistance) when operator 106 is operating vehicle 104. For example, one push of a button or touch on the interface may indicate an attempt to make U-turn 108 at a specific location and, in some implementations, this may trigger or otherwise launch a driving assistance application associated with driving assistance system 110.

In some implementations, driving assistance system 110 may be incorporated into at least one of the following associated with vehicle 104: a vehicle navigation system, a vehicle infotainment system, or a Global Positioning System (GPS) system. In these instances, certain functions of the driving assistance system 110 may be implemented by one or more of the vehicle navigation system, the vehicle infotainment system, and the GPS system associated with vehicle 104.

Vehicle 104 may further include a sensor system 112. Sensor system 112 may include multiple sensors 112(1)-112(N), where N is a positive integer greater than 1, which may be placed on multiple locations of vehicle 104. Sensor system 112 may include various types of sensors such as a laser radar, a vehicle speed sensor, a front-facing camera, a side-facing camera, a side-facing radar, and/or a blinker detector. These sensors detect environmental parameters and vehicle parameters, and provide geographic information and vehicle information of a current situation to driving assistance system 110 of vehicle 104.

A laser radar of sensor system 112 may be mounted on the front of vehicle 104 and used for obstacle detection to assist vehicle safely through environments. For example, the laser radar may determine where potential obstacle(s) exist(s) in the environment and where vehicle 104 is in relation to the potential obstacle(s). The laser radar may be configured for free space sensing and/or motion planning to detect objects and determine feasible paths for U-turn 108 at road segment 102. In some implementations, other sensors, such as an ultrasonic three-dimensional (3D) imaging system, may also be configured for free space sensing and/or motion planning.

A vehicle speed sensor of sensor system 112 may detect a traveling speed of vehicle 104 based on, for example, a rotational speed of a wheel of vehicle 104. A front facing camera of sensor system 112 may be mounted on the front of vehicle 104 to detect a road environment ahead of vehicle 104. The front facing camera may generate images of a road ahead of vehicle 104 and transmit the images to driving assistance system 110. A blinker detection of sensor system 112 may detect an actuation state of blinkers or direction indicators by operator 106 with respect to vehicle 104.

In some implementations, sensor system 112 may include attachable sensors, which may be temporarily attached to vehicle 104. For example, the attachable sensors may be placed on a plurality of locations of vehicle 104 (e.g., multiple corners of vehicle 104). The attachable sensors may include ultrasonic or capacitive sensors with a certain attaching mechanism (e.g., magnets, stick on, and mounted). Once the sensors are positioned, a reader in vehicle 104 (e.g., driving assistance system 110) may receive signals from the sensors via, for example, Bluetooth, Near Field Communication (NFC), infrared and/or Wi-Fi and then provide information indicative of sensed parameters to driving assistance system 110.

In some implementations, driving assistance system 110 may communicate with a remote driving assistance service 114 via a network 116. Network 116 may include wired and/or wireless networks that enable communications between the various computing devices described in environment 100. In some embodiments, network 116 may include local area networks (LANs), wide area networks (WAN), mobile telephone networks (MTNs), and other types of networks, possibly used in conjunction with one another, to facilitate communication between the various computing devices.

Driving assistance service 114 may include a set of related software and/or hardware components that may be reused for different purposes, and may function together with user-defined policies to provide driving assistance to operator 106. In some implementations, driving assistance service 114 may include a computing system 118 (e.g., one or more servers) which may be configured to facilitate the driving assistance associated with driving assistance system 110. For example, computing system 118 may provide geographic information associated with road segment 102 and vehicle information of vehicle 104 to driving assistance system 110 in response to a request from driving assistance system 110 via network 116.

In some implementations, driving assistance system 110 may receive geographic information of a destination and geographic information of a current location at road segment 102. Driving assistance system 110 may evaluate feasibility of a U-turn along a path between the current location and the destination using the geographic information. Driving assistance system 110 may calculate U-turn cost associated with the U-turn representative of the feasibility. Further, driving assistance system 110 may determine a feasible route between the current location and the destination based on the U-turn cost parameter using a path routing algorithm. For instance, if the calculated U-turn cost associated with a U-turn along the path between the current location and the destination is greater than a threshold value, then driving assistance system 110 may determine a feasible route that requires no U-turn between the current location and the destination. Alternatively, if the calculated U-turn cost associated with each of one or more U-turns along the path between the current location and the destination is less than the threshold value, then driving assistance system 110 may determine a feasible route that may include such one or more U-turns to avoid other path(s) having at least one U-turn having a U-turn cost greater than the threshold value.

In some implementations, driver assistance system 110 may record in a buffer reading from sensor system 112 on approach to a potential U-turn location or while going by a potential U-turn location. The recorded readings may be used later to evaluate whether a potential planned is collision-free. The recorded readings may be transferred through network 116, processed by driver assistance service 114 then stored on computing system 118.

Figure 2:
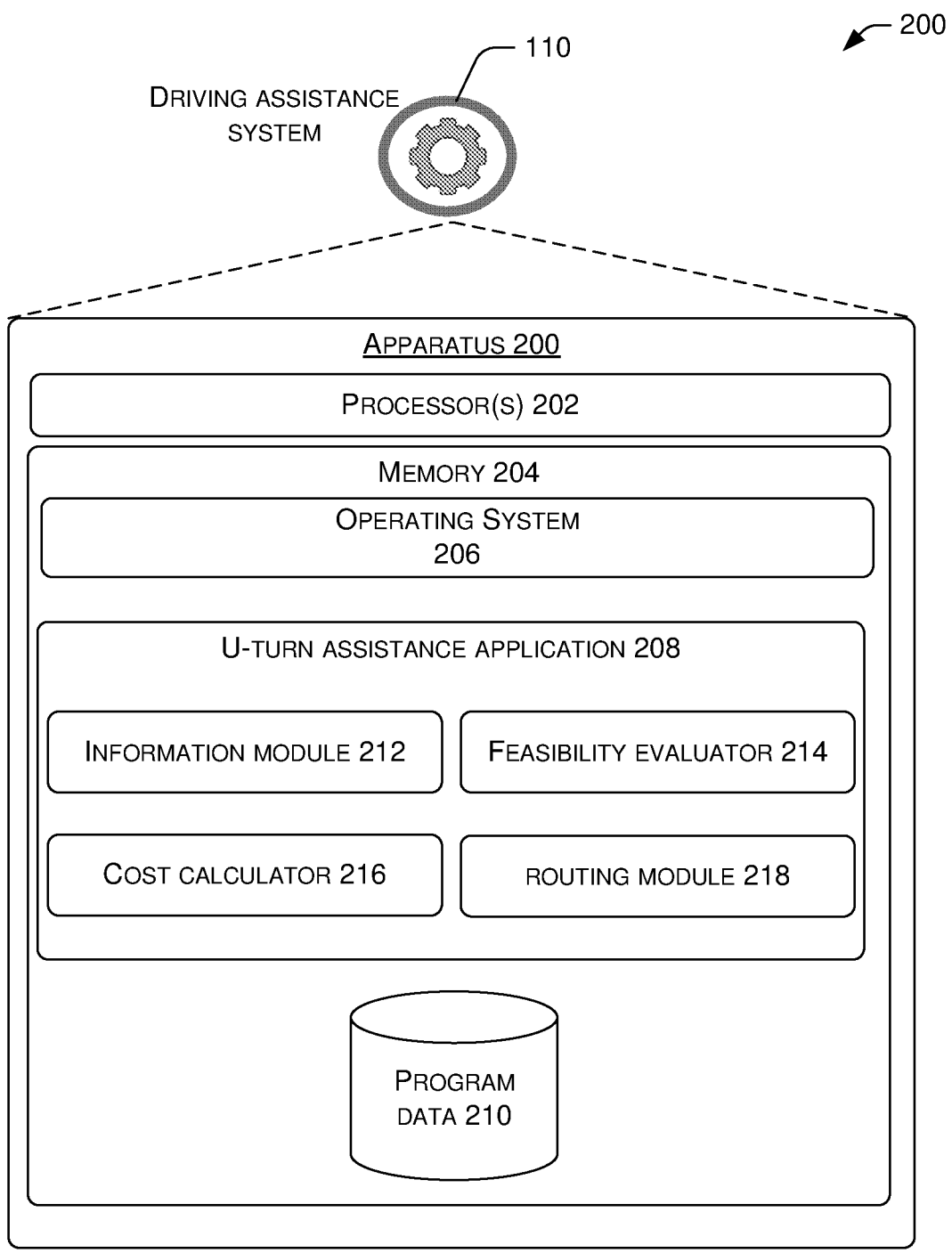
FIG. 2 is a block diagram depicting an example apparatus in accordance with an embodiment of the present disclosure.

FIG. 2 illustrates an example apparatus 200 in accordance with an embodiment of the present disclosure. Apparatus 200 may be an example implementation of driving assistance system 110 and, as depicted in FIG. 2, shows additional details of driving assistance system 110. Apparatus 200 may include at least those components shown in FIG. 2 as well as other components not shown, which may include additional modules, kernels, data, and/or hardware.

Apparatus 200 may include processor(s) 202 and memory 204. Memory 204 may store various modules, applications, programs, or other data, including one or more sets of instructions that, when executed by processor(s) 202, cause processor(s) 202 to perform the operations described herein pertaining to U-turn assistance. Processor(s) 202 may include one or more central processing units (CPU), one or more graphics processing units (GPU) and one or more application-specific integrated circuits (ASIC).

Apparatus 200 may include additional data storage devices (removable and/or non-removable) including one or more computer-readable media. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, program data, or other data. A system memory, a removable storage and a non-removable storage may be examples of computer storage media. Computer storage media may include, but is not limited to, random-access memory (RAM), read-only memory (ROM), electrically erasable programmable read-only memory (EEPROM), flash memory or other memory technology, compact disc (CD)-ROM, digital versatile disks (DVD), or other optical storage, magnetic cassettes, magnetic tape, magnetic disk storage or other magnetic storage devices, or any other medium that can be used to store the desired information and which can be accessed by apparatus 200. Any such computer storage media may be part of apparatus 200. Moreover, the computer-readable media may include computer-executable instructions that, when executed by processor(s) 202, perform various functions and/or operations described herein.

In some implementations as shown in FIG. 2, memory 204 may store one or more sets of instructions associated with an operating system 206, a U-turn assistance application 208 and program data 210. The U-turn assistance application 208 may include various modules such as an information module 212, a feasibility evaluator 214, a cost calculator 216, and a routing module 218.

Information module 212 may be configured to receive geographic information of a destination and geographic information of a current location at road segment 102. Moreover, information module 212 may collect user information (e.g., user behavior) of operator 106 of vehicle 104.

Geographic information refers to vehicle information related to a geographic location of the vehicle. Geographic location refers to a relative location (e.g., San Francisco, 500 Sea World Drive, San Diego, Calif. 92109, etc.) as a displacement for another site or an absolute location using a coordinate system (e.g., a spherical coordinate system or a world geodetic system). In some implementations, the geographic information may include images of a road ahead of vehicle 104 that are collected by sensor system 112. These images may be used to generate an assistance instruction provided to operator 106 to assist operator 106 to operate U-turn 108.

User information may include a collection of records of user information (e.g., user preference data) and behavior (e.g., User behavior data) that is, for example, associated with operator 106 of vehicle 104. User preference data may include choices that operator 106 has made with respect to making U-turns in operating vehicle 104 (e.g., highly comfortable, partially comfortable, not comfortable, etc.). For example, the user preference data may include implicit and/or explicit information about a user, the extent to which operator 106 likes or dislikes U-turn operations. The implicit and/or explicit information may be extracted from previous user interactions by operator 106 with the driving assistance system 110. For example, explicit information may be in the form of ratings associated with the U-turn operation as inputted by operator 106, and implicit information may be generated by interpreting the user interactions.

User behavior data may include user interaction with driving assistance system 110 during U-turns. For example, user activities of operator 106 during U-turns may be collected and stored to generate multiple user activity events of U-turns. These multiple user activity events may indicate whether previous U-turns operated by operator 106 are successful and/or unsuccessful and may be used to measure a successful rate of U-turns operated by operator 106 in a predetermined time period. For example, the user behavior data may include a number of failed U-turn and/or successful U-turns that were performed by operator 106 in a predetermined time period associated with operations of vehicle 104 within a predetermined range of area associated with road segment 102.

In some implementations, information module 212 may further obtain vehicle information of vehicle 104. Vehicle information may include various static parameters (e.g., a length of vehicle 104, a width of vehicle 104, and vehicle tow ratings), control parameters (e.g., steering parameters, braking parameters, and throttle parameters), and/or performance parameters (e.g., a speed, a heading, and a location) associated with vehicle 104.

A turning radius of vehicle 104 refers to the radius of a circular turn that vehicle 104 is capable of making. For example, the turning radius of a U-turn may refer to the smallest circular turn that the vehicle may make without hitting a street curb with a wheel or without scraping a wall around the street by vehicle 104. The turning radius of vehicle 104 may be calculated based on parameters of vehicle 104.

Feasibility evaluator 214 may be configured to evaluate a feasibility of a U-turn based on the geographic information. For example, feasibility evaluator 214 may evaluate the feasibility of the U-turn 108 based on the geographic information of road segment 102, the user behavior of operator 106, and the vehicle information of vehicle 104 that are collected and/or obtained by information module 212. The feasibility of U-turn 108 may indicate how likely vehicle 104 is capable of making U-turn 108 at road segment 102 (e.g., safe, likely safe or not safe).

In some implementations, information module 212 may receive from operator 106 a driving assistance request associated with U-turn 108. Feasibility evaluator 214 may further determine whether the feasibility of U-turn 108 is less than a predetermined value, and provide an additional geographic location to make a U-turn in lieu of U-turn 108 in response to a determination that the feasibility of U-turn 108 is less than a predetermined value. For example, the additional geographic location may indicate an alternative route between the current location at road segment 102 and the destination.

Cost calculator 216 may be configured to calculate a U-turn cost parameter associated with the U-turn as a function of the feasibility. For example, U-turn cost parameter refers to a value for rendering U-turn 108, which may be determined based on one or more cost factors influencing whether operator 106 may successfully operate vehicle 104 to render U-turn 108 within a predetermined time. For example, cost factors may include a feasibility of U-turn 108, an expected time for U-turn 108, user preference on U-turns and/or availability of feasible routes between the current location and the destination not requiring a U-turn.

In some implementations, cost calculator 216 may determine whether the U-turn cost parameter is greater than a predetermined value, and routing module 218 may present the feasible route including the U-turn in response to a determination that the U-turn cost parameter is not greater than the predetermined value. Routing module 218 may also present a feasible route not including any U-turn. Alternatively, routing module 218 may present a feasible route with a warning message to operator 106 in response to a determination that a U-turn cost parameter associated with a U-turn along the feasible route is greater than the predetermined value.

Routing module 218 may be configured to determine a feasible route based on the U-turn cost parameter using a path routing algorithm. A feasible route refers to a driving path or map in which vehicle 104 may move from a current location to a destination. In some implementations, there may be more than one feasible routes that are generated based on the geographic information and/or vehicle information. In these instances, routing module 218 may select a feasible route having a U-turn cost parameter less than those of other feasible routes.

In some implementations, a route planning algorithm (e.g., A-Star graph routing algorithm) may be implemented to determine more than one sequence of links (e.g., possible paths), including U-turns and non-U-turns, connecting a source node (e.g., current location) and a destination node (e.g., destination). In these instances, the sequence or path among multiple sequences/paths with the lower/lowest cost may be selected.

Figure 3:
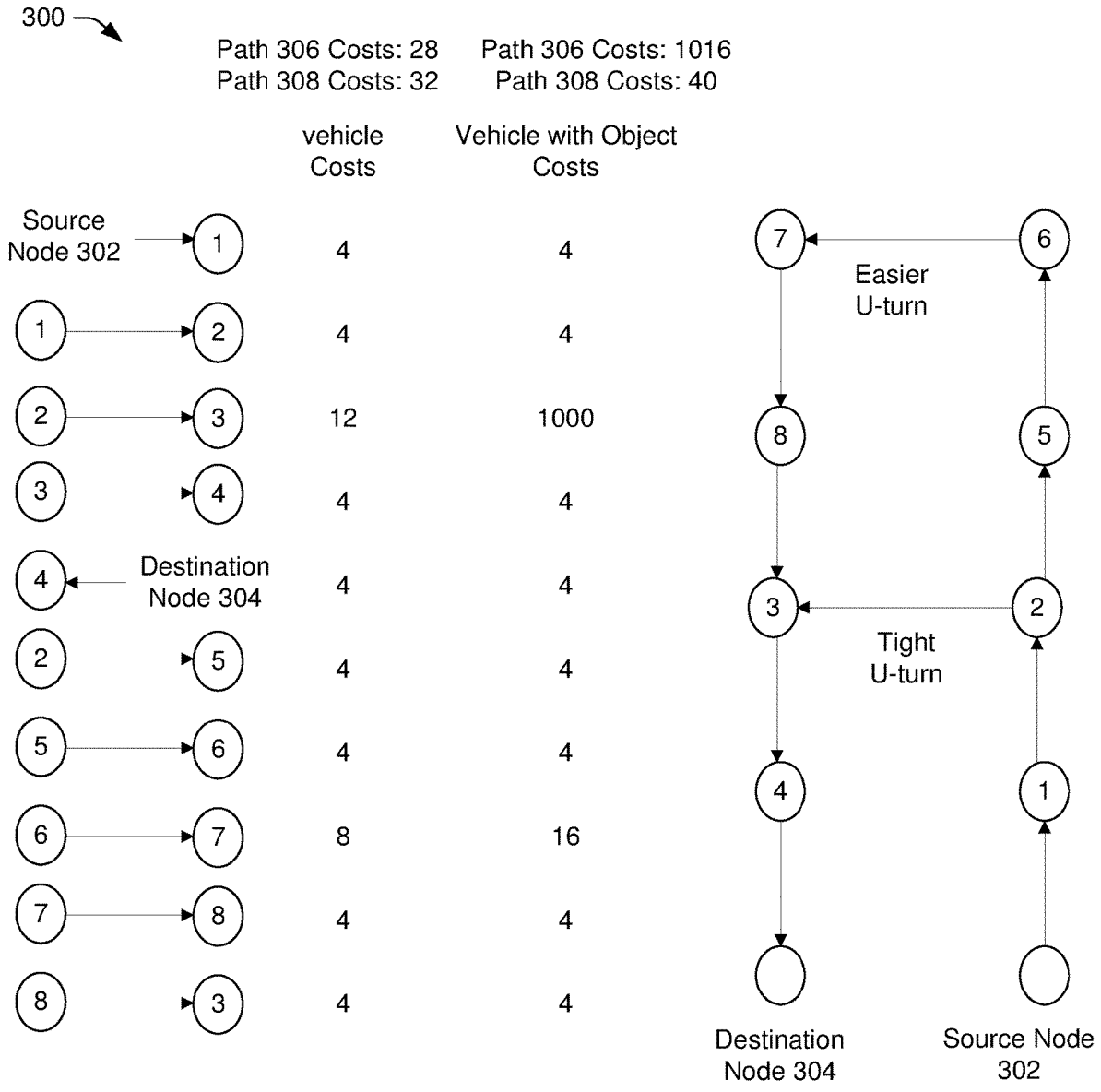
FIG. 3 is a diagram depicting implementation of an example route planning algorithm in accordance with an embodiment of the present disclosure.

For example, as illustrated in FIG. 3, two sequences of links connecting a source node 302 and a destination node 304 may correspond to a path 306 and a path 308, respectively. Using the route planning algorithm, routing module 218 may calculate the total costs of link costs of each potential path, namely path 306 and path 308. For example, the total costs associated with path 306 for a passenger vehicle may be 28 and the total costs associated with path 308 for the passenger vehicle may be 32. Accordingly, routing module 218 may select path 306 instead of path 308 as the feasible route for the passenger vehicle. As another example, the total costs associated with path 306 for a vehicle towing an object may be 1016 and the total costs associated with path 308 for the vehicle may be 40. Accordingly, routing module 218 may select path 308 instead of path 306 as the feasible route for the vehicle towing an object.

In some implementations, certain information associated with vehicle 104 and a plurality of paths may be further utilized to determine a feasible route using, for example, a rapidly exploring random tree (RRT) path-planning algorithm. In these instances, the certain information may include allowable configurations of one or more paths associated with the feasible route, and constraints (e.g., the max steering angle) associated with the one or more paths and vehicle 104. Further, routing module 218 may obtain information to evaluate whether a candidate path from one configuration to another is collision-free. For example, the configuration associated with a vehicle may include a geographic coordinate of a location of the vehicle and a direction that the vehicle is facing. For a truck with a trailer, the configuration may include a geographic coordinate of a location of the vehicle, a direction the truck is facing, and an angle of the trailer relative to the truck.

Figure 4:
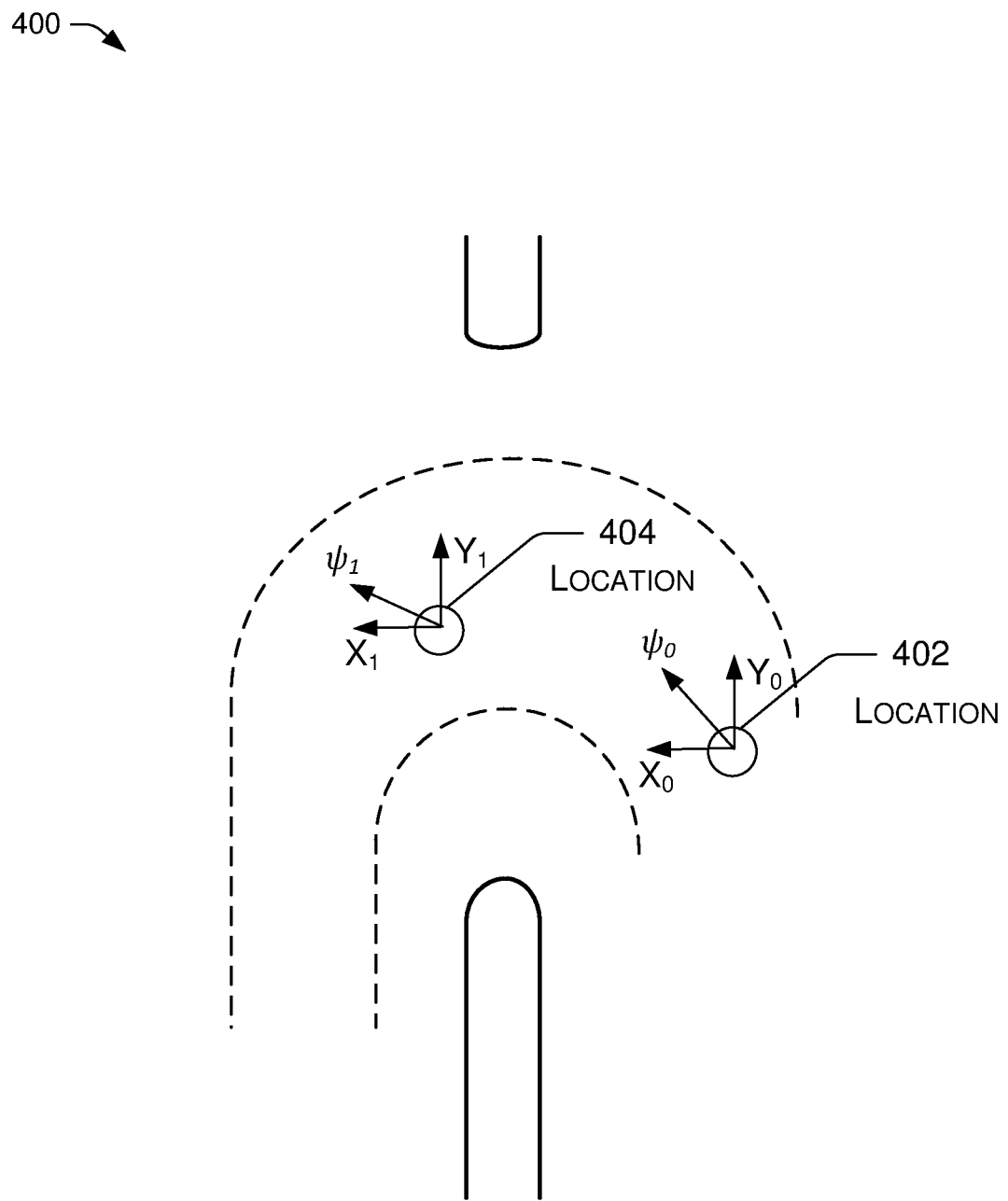
FIG. 4 is another diagram depicting implementation of an example path planning algorithm in accordance with an embodiment of the present disclosure.

For example, as illustrated in FIG. 4, vehicle 104 may make a U-turn from a location 402 to a location 404. A path planning algorithm may be implemented to compute collision-free path while ignoring constraints, and then transform the path to one that obeys constraints. Assume a collision computation function C exits as follows: C: (x, y)×(x, y)→{0,1}, routing module 218 may determine that the path between location 402 to location 404 is collision-free for certain vehicle parameters (e.g., length, width, trailer parameters, etc.) of vehicle 104. In these instances, route module 218 may determine certain dynamics using the following formulas, wherein x represents an easting coordinate, y represents a northing coordinate, θ represents a vehicle heading, φ represents a steering angle, x' represents a derivative in the easting coordinate with respect to time, y' represents a derivative in the northing direction with respect to time, θ' represents a derivative in the steering angle with respect to time, u represents velocity of a vehicle, and L represents wheelbase of the vehicle, assuming u=$u_0$ and constrain steering angle |φ|<Φ.

$$x' = u \cos \theta$$
$$y' = u \sin \theta$$
$$\theta' = \frac{u}{L} \tan \phi$$

Further, routing module 218 may present the feasible route to operator 106 to assist the operator 106 in operating vehicle 104 from the current location at road segment 102 to the destination. In these instances, information module 212 may receive user feedback from operator 106 after vehicle 104 arrives at the destination, and driving assistance system 110 may modify the path routing algorithm based on the user feedback. For example, the user feedback may indicate choices that operator 106 has made or opinions of operator 106 with respect to a U-turn such as U-turn 108 (e.g., whether the U-turn was successful, partially successful, or unsuccessful).

Figure 5:
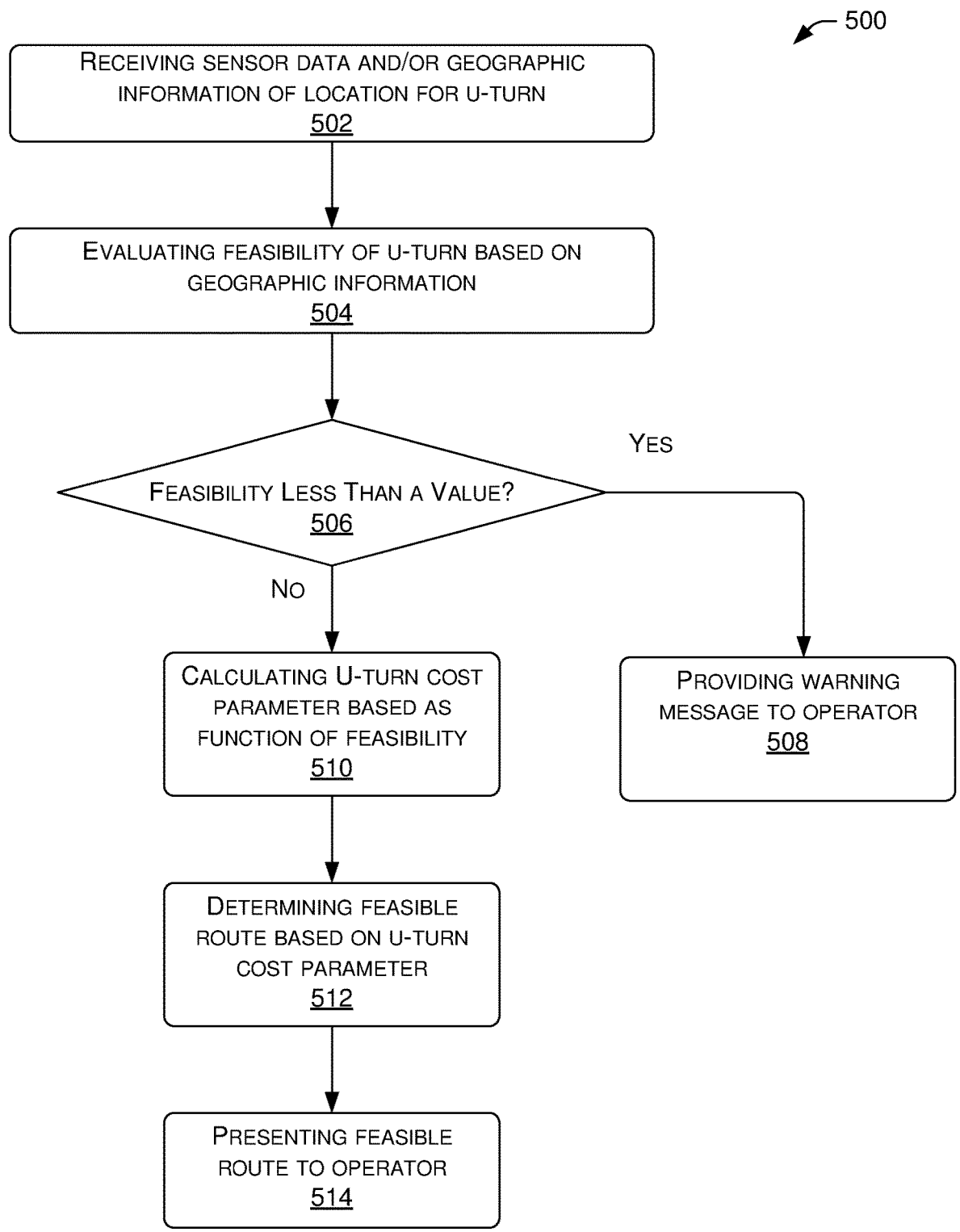
FIG. 5 is a flowchart of an example process in accordance with an embodiment of the present disclosure.

FIG. 5 illustrates an example process 500 in accordance with an embodiment of the present disclosure. Process 500 may include one or more operations, actions, or functions shown as blocks such as 502, 504, 506, 508, 510, 512 and 514. Although illustrated as discrete blocks, various blocks of process 500 may be divided into additional blocks, combined into fewer blocks, or eliminated, depending on the desired implementation. Process 500 may be implemented by driving assistance system 110 and apparatus 200. For simplicity of description and not limiting the scope of the present disclosure, process 500 is described below in the context of apparatus 200 as an example implementation of driving assistance system 110. Process 500 may begin with block 502.

At 502, processor(s) 202 may receive sensor data and/or geographic information of a destination and geographic information of road segment 102, and/or vehicle information of vehicle 104. Alternatively or additionally, processor(s) 202 may receive sensor data (e.g., from sensor system 112). Further, processor(s) 202 may collect user behavior data of operator 106 of vehicle 104 associated with U-turns. In these instances, the user behavior data may include a number of failed U-turn and/or successful U-turns that are operated by operator 106 in a predetermined time period or a predetermined range of area associated with road segment 102. In some implementations, the user behavior may include user preference of the operator of the vehicle on operation of U-turns.

At 504, processor(s) 202 may evaluate a feasibility of a U-turn based on the geographic information. For example, processor(s) 202 may evaluate the feasibility of U-turn 108 based on the geographic information, the user behavior, and the vehicle information. In these instances, the vehicle information of the vehicle may include a length and a width of the vehicle and a turning radius of the vehicle At 506, processor(s) 202 may determine whether the feasibility of the U-turn is less than a predetermined value. For example, the predetermined value may be determined based on statistic data associated with operator 106 of vehicle 104 of rendering U-turns.

At 508, processor(s) 202 may generate and provide a warning message to operator 106 in response to a determination that the feasibility of the U-turn is less than a predetermined value ("Yes" branch of operation 506). For example, processor(s) 202 may provide the warning message and/or an additional geographic location for U-turn 108 in response to a determination that the feasibility of the U-turn is less than a predetermined value.

At 510, processor(s) 202 may calculate a U-turn cost parameter associated with U-turn 108 as a function of the feasibility if the feasibility of the U-turn is not less than a predetermined value ("No" branch of operation 506). In these instances, processor(s) 202 may further determine whether the U-turn cost parameter is greater than a predetermined value.

Processor(s) 202 may present the feasible route including U-turn 108 at the road segment 102 in response to a determination that the U-turn cost parameter is not greater than the predetermined value. Processor(s) 202 may present the feasible route not including U-turn 108 at the road segment 102 or a warning message to the operator in response to a determination that the U-turn cost parameter is greater than a predetermined value.

At 512, processor(s) 202 may determine a feasible route based on the U-turn cost parameter using a path routing algorithm. For example, processor(s) 202 may determine a driving path or map in which vehicle 104 may move from road segment 102 to the destination.

At 514, processor(s) 202 may present the feasible route to operator 106 to assist the operator to operate vehicle 104 from road segment 102 to the destination. In some implementations, processor(s) 202 may receive user feedback after the vehicle arrives the destination, and modify the path routing algorithm based on the user feedback.

The articles "a" and "an" are used herein to refer to one or to more than one (i.e., to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code or the like), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
receiving geographic information of a destination and geographic information of a current location of a vehicle;
collecting user behavior data of an operator of the vehicle associated with one or more previous U-turns, wherein the user behavior data comprises a number of failed U-turns and a number of successful U-turns performed by the operator in a predetermined time period or a predetermined range of area associated with the current location;
evaluating feasibility of a U-turn along a path between the current location and the destination based at least in part on the geographic information and the user behavior data;
calculating a U-turn cost parameter associated with the U-turn, wherein the U-turn cost parameter comprises a value for rendering the U-turn associated with the evaluated feasibility;
determining a feasible route between the current location and the destination based on the U-turn cost parameter using a routing algorithm;
presenting the feasible route to the operator of the vehicle to assist the operator to operate the vehicle returning from the current location to the destination; and
moving the vehicle from the current location to the destination along the feasible route.

2. The method of claim 1, further comprising:
obtaining vehicle information of the vehicle.

3. The method of claim 2, wherein the evaluating of the feasibility of the U-turn using the geographic information comprises evaluating the feasibility of the U-turn based on the geographic information, the user behavior data, and the vehicle information.

4. The method of claim 1, further comprising:
receiving a driving assistance request associated with the U-turn;
determining whether the feasibility of the U-turn is less than a predetermined value; and
identifying an additional location for the U-turn in response to a determination that the feasibility of the U-turn is less than a predetermined value.

5. The method of claim 1, further comprising:
determining whether the U-turn cost parameter is greater than a predetermined value;
presenting the feasible route comprising the U-turn in response to a determination that the U-turn cost parameter is not greater than the predetermined value; and
presenting the feasible route without the U-turn or with the U-turn along with a warning message to the operator in response to a determination that the U-turn cost parameter is greater than a predetermined value.

6. The method of claim 1, further comprising:
receiving user feedback provided by the operator after the vehicle arrives at the destination; and
modifying the routing algorithm based on the user feedback.

7. The method of claim 1, wherein the vehicle information of the vehicle comprises a length and a width of the vehicle, a vehicle tow rating, and a turning radius of the vehicle.

8. The method of claim 1, wherein the user behavior data comprises user preference of the operator of the vehicle regarding U-turns.

9. A system comprising:
one or more processors; and
memory to maintain a plurality of components executable by the one or more processors, the plurality of components comprising:
an information module configured to receive geographic information of a destination and geographic information of a current location of a vehicle and to collect user behavior data of an operator of the vehicle associated with one or more previous U-turns, wherein the user behavior data comprises a number of failed U-turns and a number of successful U-turns performed by the operator in a predetermined time period or a predetermined range of area associated with the current location;

a feasibility evaluator configured to evaluate feasibility of a U-turn along a path between the current location and the destination based at least in part on the geographic information and the user behavior data;

a cost calculator configured to calculate a U-turn cost parameter comprising a value for rendering the U-turn associated with the evaluated feasibility; and a routing module configured to determine a feasible route between the current location and the destination based on the U-turn cost parameter using a routing algorithm and to present the feasible route to the operator of the vehicle to assist the operator to operate the vehicle returning from the current location to the destination, wherein the vehicle is moved from the current location to the destination along the feasible route.

10. The system of claim 9, wherein the information module is further configured to: obtain vehicle information of the vehicle.

11. The system of claim 10, wherein the evaluating of the feasibility of the U-turn using the geographic information comprises evaluating the feasibility of the U-turn based on the geographic information, the user behavior data, and the vehicle information.

12. The system of claim 10, wherein the vehicle information of the vehicle comprises a length and a width of the vehicle, a vehicle tow rating, and a turning radius of the vehicle.

13. One or more computer-readable media storing computer-executable instructions that, when executed on one or more processors, causes the one or more processors to perform acts comprising:

collecting user behavior data of an operator of a vehicle associated with one or more previous U-turns, wherein the user behavior data comprises a number of failed U-turns and a number of successful U-turns performed by the operator in a predetermined time period or a predetermined range of area associated with the current location;

obtaining vehicle information of a vehicle;

receiving geographic information of a destination and geographic information of a current location of the vehicle;

evaluating feasibility of a U-turn along a path between the current location and the destination based on the geographic information, the user behavior data, and the vehicle information;

calculating a U-turn cost parameter associated with the U-turn, wherein the U-turn cost parameter comprises a value for rendering the U-turn associated with the evaluated feasibility;

determining a feasible route between the current location and the destination based on the U-turn cost parameter using a routing algorithm;

presenting the feasible route to the operator of the vehicle to assist the operator to operate the vehicle returning from the current location to the destination; and moving the vehicle from the current location to the destination along the feasible route.

14. The one or more computer-readable media of claim 13, wherein the acts further comprise:

receiving a driving assistance request associated with the U-turn;

determining whether the feasibility of the U-turn is less than a predetermined value; and identifying an additional location for the U-turn in response to a determination that the feasibility of the U-turn is less than a predetermined value.

15. The one or more computer-readable media of claim 13, wherein the acts further comprise:

determining whether the U-turn cost parameter is greater than a predetermined value;

presenting the feasible route comprising the U-turn in response to a determination that the U-turn cost parameter is not greater than the predetermined value; and presenting the feasible route without the U-turn or with the U-turn along with a warning message to the operator in response to a determination that the U-turn cost parameter is greater than a predetermined value.

16. The one or more computer-readable media of claim 13, wherein the acts further comprise:

receiving user feedback provided by the operator after the vehicle arrives at the destination; and modifying the routing algorithm based on the user feedback.

* * * * *